US012583457B2

(12) United States Patent
Fayad et al.

(10) Patent No.: US 12,583,457 B2
(45) Date of Patent: Mar. 24, 2026

(54) METHOD FOR ASSISTING A VEHICLE USER DURING A LANE CHANGE MANEUVER TAKING INTO ACCOUNT DIFFERENT AREAS IN THE SURROUNDINGS OF THE VEHICLE, AND DRIVER ASSISTANCE SYSTEM FOR A VEHICLE

(71) Applicant: Bayerische Motoren Werke Aktiengesellschaft, Munich (DE)

(72) Inventors: Sami Fayad, Munich (DE); Stephan Niermann, Hebertshausen (DE); Dominik Rieth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 53 days.

(21) Appl. No.: 18/704,417

(22) PCT Filed: Sep. 12, 2022

(86) PCT No.: PCT/EP2022/075209
§ 371 (c)(1),
(2) Date: Apr. 24, 2024

(87) PCT Pub. No.: WO2023/072473
PCT Pub. Date: May 4, 2023

(65) Prior Publication Data
US 2025/0002021 A1      Jan. 2, 2025

(30) Foreign Application Priority Data
Oct. 26, 2021    (DE) ..................... 10 2021 127 817.1

(51) Int. Cl.
*B60W 30/18* (2012.01)
*B60W 50/00* (2006.01)
(Continued)

(52) U.S. Cl.
CPC ................. *B60W 30/18163* (2013.01); *B60W 2554/4049* (2020.02); *B60W 2554/406* (2020.02)

(58) Field of Classification Search
CPC ... B60W 30/18163; B60W 2554/4049; B60W 2554/406; B60W 2050/0091;
(Continued)

(56) References Cited

U.S. PATENT DOCUMENTS 11,014,562 B2 * 5/2021 Fukuda ................. B60W 30/10
12,097,860 B2 * 9/2024 Kitagawa ........ B60W 30/18163
(Continued)

FOREIGN PATENT DOCUMENTS

DE     10 2011 106 746 A1    1/2013
DE     10 2015 110 969 A1    1/2017
(Continued)

OTHER PUBLICATIONS

International Search Report (PCT/ISA/210) issued in PCT Application No. PCT/EP2022/075209 dated Jan. 4, 2023 (2 pages).
(Continued)

*Primary Examiner* — Rachid Bendidi
*Assistant Examiner* — Hossam M Abd El Latif
(74) *Attorney, Agent, or Firm* — Crowell & Moring LLP

(57) ABSTRACT

A method for assisting a vehicle user during a lane change maneuver includes receiving a navigation command for performing the lane change maneuver from a second lane to a first lane of a road; searching for gaps for the vehicle in the first lane and selecting one of the gaps; defining a far field, a mid field and a near field; and performing the search and/or the selection of the gap according to a predefined sequence in which first a region of the far field, then a region of the mid field, and then the near field are checked.

10 Claims, 5 Drawing Sheets

(51) Int. Cl.
*B60W 50/14* (2020.01)
*B60W 60/00* (2020.01)

(58) Field of Classification Search
CPC ......... B60W 50/14; B60W 2554/4041; B60W
2720/10; B60W 60/0011; B60W
2720/103
See application file for complete search history.

(56) References Cited

U.S. PATENT DOCUMENTS

| | | | |
|---|---|---|---|
| 2016/0063858 A1* | 3/2016 | Schmüdderich .. | B60W 30/0956 |
| | | | 701/117 |
| 2019/0382020 A1 | 12/2019 | Niibo et al. | |
| 2020/0307597 A1* | 10/2020 | Oka ................ | B60W 30/18163 |
| 2023/0041319 A1* | 2/2023 | You ................. | G08G 1/096791 |

FOREIGN PATENT DOCUMENTS

| | | |
|---|---|---|
| DE | 10 2020 117 160 B3 | 10/2021 |
| DE | 10 2020 117 161 A1 | 12/2021 |

OTHER PUBLICATIONS

German-language German Search Report issued in German Application No. 10 2021 127 817.1 dated Jun. 8, 2022, with partial English translation (8 pages).

* cited by examiner

METHOD FOR ASSISTING A VEHICLE USER DURING A LANE CHANGE MANEUVER TAKING INTO ACCOUNT DIFFERENT AREAS IN THE SURROUNDINGS OF THE VEHICLE, AND DRIVER ASSISTANCE SYSTEM FOR A VEHICLE

CROSS REFERENCE TO RELATED APPLICATION

This application is a 371 of International Application No. PCT/EP2022/075209, filed Sep. 12, 2022 which claims priority under 35 U.S.C. § 119 from German Patent Application No. 10 2021 127 817.1, filed Oct. 26, 2021, the entire disclosure of which is herein expressly incorporated by reference.

BACKGROUND AND SUMMARY

The present invention relates to a method for assisting a user of a vehicle during a lane change maneuver. In addition, the present invention relates to a driver assistance system for a vehicle.

Driver assistance systems for carrying out at least partially automated lane change maneuvers or so-called lane change assistance systems are known from the prior art. In the case of these driver assistance systems with an automated or automatic lane change function, the user or driver typically indicates a desired lane change by way of a certain operating action. If such an operating action is detected, the driver assistance system is used to maneuver the vehicle along a planned trajectory to the adjacent lane or the target lane with automated lateral guidance and generally also with automated longitudinal guidance. In the case of such driver assistance systems or lane change assistance systems, the driver's lane change request is usually signaled by actuating a corresponding operating element, for example a turn signal lever, in order to activate turn signals visible outside the vehicle.

Known driver assistance systems or lane change assistance systems generally monitor the environment of the vehicle before the lane change maneuver by means of suitable environmental sensors. It is then possible to change lane in response to the operating action of the user if a free gap for the user's own vehicle has been detected in the adjacent lane.

In addition, the prior art discloses driver assistance systems which assist the user of the vehicle on a multi-lane road upon reaching an exit ramp. In this case, for example on account of an input of a navigation destination, the driver assistance system can prepare for all necessary lane changes until reaching an exit ramp. For this purpose, the driver assistance system can first of all detect a free gap for the vehicle in the adjacent lane and can then adjust the speed of the vehicle for the subsequent lane change maneuver into the detected gap. The lane change maneuver itself can be carried out by means of a lane change assistance system, wherein the lane change assistance system is triggered automatically or after an operating input by the user.

In this context, DE 10 2020 117 161 A1 describes a vehicle system for operating a lane change assistance function of a motor vehicle. In this case, the vehicle system is configured to determine that the vehicle should carry out a route-related lane change in order to drive along a planned route. In addition, the vehicle system is configured to select a gap for the route-related lane change from a set of gaps in such a manner that a gap that is at the front in relation to the vehicle has a higher priority in the selection than a gap that is at the rear in relation to the vehicle.

The object of the present invention is to show a solution for how a driver assistance system of the type mentioned at the outset can be operated more efficiently in terms of the search for and/or selection of gaps between road users.

This object is achieved, according to the invention, by means of a method and by means of a driver assistance system having the features according to the independent claims. Advantageous developments of the present invention are specified in the dependent claims.

A method according to the invention is used to assist a user of a vehicle during a lane change maneuver. The method comprises receiving a navigation command to carry out the lane change maneuver from a second lane to a first lane of a road. The method also comprises searching for gaps for the vehicle between further road users in the first lane, and selecting one of the gaps for the lane change maneuver. The method also comprises defining a far field, a mid field and a near field in the surroundings of the vehicle, wherein the near field adjoins the vehicle, the mid field adjoins the near field and the far field adjoins the mid field. In addition, the far field is outside a capture range of environmental sensors of the vehicle. The near field and the mid field are within the capture range of the environmental sensors. The method also comprises searching for and/or selecting the gap according to a predetermined order in which first an area of the far field that is in front of the vehicle in the direction of travel of the vehicle, then an area of the mid field that is in front of the vehicle in the direction of travel of the vehicle and then the near field are checked.

The method is intended to be used to assist the user or driver of the vehicle when maneuvering the vehicle on a multi-lane road. The multi-lane road may basically be a highway, a federal highway, a freeway, an expressway-like road or the like. The multi-lane road is preferably an expressway. The road may have, for example, two carriageways each with at least two lanes which are referred to in the present case as the first lane and second lane. Both the driver's own vehicle and further road users may move in a predefined direction of travel in these lanes. The road may also have further lanes. In this case, the first lane may adjoin an exit ramp or a deceleration lane which leads to the exit ramp. The first lane may be, for example, the right-hand lane of an expressway.

The driver assistance system of the vehicle is used to receive the navigation command which describes the fact that the vehicle is intended to carry out a lane change maneuver from the second lane to the first lane. In particular, the navigation command describes the fact that the vehicle is intended to be maneuvered from the second lane, across the first lane, to the exit ramp of the road. In other words, a lane change from the second lane to the first lane is first of all intended to be carried out and the vehicle is then intended to leave the road via the exit ramp. Furthermore, the vehicle can change from the road to another road via the exit ramp. This may be the case, for example, with an expressway interchange or the like. In principle, the navigation command can be predefined by route guidance or a navigation system of the vehicle. Alternatively or additionally, the navigation command may be due to a corresponding operating input by the user.

Furthermore, the driver assistance system can be used to prepare for the lane change or the lane change maneuver from the second lane to the first lane. For this purpose, corresponding environmental sensors of the driver assistance system or of the vehicle can first of all be used to search for free gaps for the vehicle in the first lane. Free gaps between the further road users in the first lane, which are suitable for the subsequent lane change maneuver, can therefore be found.

Provision may also be made for the driver assistance system to be used to adjust a speed of the vehicle or the longitudinal speed in order to prepare for the lane change maneuver. In particular, the speed of the driver's own vehicle can be reduced or can be adjusted to the speed of the further road users in the first lane. For example, the speed of the vehicle can be adjusted in such a manner that a gap in the target lane is pursued.

If, for example, a free gap has been found, a corresponding suggestion to actuate an operating element or the turn signal lever can be output to the user. On account of the actuation of the operating element, the lane change maneuver from the second lane to the first lane can then be triggered or initiated. The lane change maneuver can be carried out automatically or in an automated manner by means of the driver assistance system or a lane change assistance system.

According to the present invention, the far field, the mid field and the near field are defined in the surroundings of the vehicle. In this case, the near field adjoins the vehicle or an outer shell of the vehicle. The near field therefore describes the immediate surroundings of the vehicle. The mid field surrounds the near field and adjoins the near field. In this case, both the near field and the mid field are within the capture range of the environmental sensors or within the capture ranges of the environmental sensors of the vehicle. In this case, the capture range describes that area which can be captured by the environmental sensors of the vehicle or that area in which objects can be detected using the environmental sensors. The environmental sensors of the vehicle or of the driver assistance system may be in the form of radar sensors, lidar sensors, cameras, ultrasonic sensors or the like. The far field surrounds the mid field and adjoins the mid field. The far field, the mid field and/or the near field can be defined starting from a reference point of the vehicle. The far field, the mid field and/or the near field can therefore move with the vehicle. The far field, the mid field and/or the near field can concentrically surround the vehicle or the reference point of the vehicle. For example, a radius may be respectively assigned to the far field, the mid field and/or the near field.

The search for the gap between the road users and/or the selection of the gap for the lane change maneuver in the first lane is/are carried out according to the predetermined order. In this case, the predetermined order provides for first the area of the far field that is in front of the vehicle in the direction of travel of the vehicle to be checked. The area of the mid field that is in front of the vehicle in the direction of travel of the vehicle is then checked. The near field is then checked for the free gaps. In other words, according to the present invention, provision is made for three horizons to be used for the search for gaps and preferably also for the selection or synchronization. These three horizons are formed by the areas of the far field and of the mid field that are in front of the vehicle and by the near field. Furthermore, the strengths of the driver assistance system are used in each area or horizon. Optimization methods, empirical values, preview and heuristics can therefore be linked to one another to form a whole. This makes it possible to save computing power and computing time. Overall, the driver assistance system for assisting a user during a lane change can therefore be made more efficient in terms of searching for the free gaps for a lane change maneuver.

A traffic density and/or an average size of the gaps between the road users is/are preferably predicted when checking the far field or the area of the far field in front of the vehicle in the direction of travel for the first lane. No further road users can be detected in the far field using the environmental sensors of the vehicle or of the driver assistance system. In this case, empirical values can be used or the traffic density can be predicted. Traffic information, for example so-called Real Time Traffic Information (RTTI), or the like can be used for this purpose. Traffic densities in the relevant lanes or in the first lane in the far field can also be determined on the basis of the measurements in the mid field and near field using the environmental sensors. Extrapolations or estimations for the traffic density in the far field can then be carried out on the basis of these measurements. In this case, corresponding empirical values can also be taken into account.

The average size of the gaps between the road users in the far field can then be derived from the lane-based traffic density or vehicle density. Furthermore, the average gap size in the far field at a specific location can be determined as a function of the vehicle's own speed, the average speed of all detected road users, the current traffic information and/or a location-based empirical coefficient. This empirical coefficient can describe, for example, the fact that the gaps in the lane tend to become smaller in the area of an exit ramp, the closer the vehicle gets to the exit ramp. Therefore, an estimation of the traffic density or the presence of gaps for the lane change maneuver can already be made, for example, as of the driving situation in which the exit ramp is in the far field.

In a further embodiment, the gaps between the road users are detected on the basis of sensor data, which are provided by the environmental sensors, when checking the mid field or the area of the mid field in front of the vehicle in the direction of travel. As already explained, further road users or vehicles can be captured in the near field and the mid field using the environmental sensors of the vehicle. In comparison with the far field, average speeds and gap sizes are not used in calculations in the mid field, in particular, but rather actual measurement variables are taken into account. This means, for example, that gaps that are actually present between the road users are detected on the basis of the sensor data from the environmental sensors. The sensors and heuristics can therefore be used to select the gaps or for synchronization in the mid field.

In a further embodiment, a plurality of trajectories for possible lane change maneuvers into the gaps between the road users in the first lane are determined for checking the near field. A plurality of trajectories into the detected free gaps in the first lane can therefore be calculated in the near field which is in the immediate environment of the vehicle. In particular, the near field can extend from the vehicle or the ego vehicle to an optimization radius. This optimization radius can be determined on the basis of the vehicle's own speed and an optimization time. This optimization time is technically determined, in particular, by the length of the trajectories to be compared. The optimization time or the length of the trajectories to be compared may in turn be dependent on the computing capacity of a computing device of the driver assistance system that is used to calculate the trajectories. For example, the computing device may be configured to calculate eight trajectories at the same time, each having a duration of 10 seconds at the current speed of the vehicle. In this case, the optimization time is 10 seconds and eight driving maneuvers or trajectories can be compared
with one another in the near field. The respective trajectories
or the gaps for the lane change maneuver can therefore be
precisely examined.

In a further embodiment, the plurality of trajectories for
the possible lane change maneuvers and a trajectory that
describes an onward journey of the vehicle in the second
lane are assessed on the basis of a cost function. A plurality
of driving maneuvers can therefore be calculated in advance
and one of the maneuvers can then be selected. These
driving maneuvers comprise, on the one hand, the possible
lane change maneuvers from the second lane to the first lane
along the previously calculated trajectories. A further driv-
ing maneuver is the variant in which the vehicle remains in
the second lane, that is to say no lane change to the first lane
is carried out. The respective trajectories or driving maneu-
vers can then be assessed for selecting the gap according to
a cost function.

Corresponding priorities can also be taken into account
when assessing the trajectories or in the cost function. For
example, gaps in front of the vehicle in the direction of travel
may have a higher priority than gaps which are beside the
vehicle. In addition, gaps which are behind the vehicle in the
direction of travel may have a lower priority than the gaps
which are beside the vehicle. Furthermore, the gaps between
the road users in the first lane may be prioritized on the basis
of their size or length based on the direction of travel. For
example, large gaps may have a higher priority than small
gaps. In addition, the costs of the trajectory, in the case of
which the vehicle remains in the second lane, can be
changed on the basis of the distance to the exit ramp. In
particular, the costs may be increased with decreasing dis-
tance to the exit ramp. Furthermore, the trajectories may be
prioritized in the cost function on the basis of their shape.
For example, that trajectory which has a minimum deriva-
tive of the acceleration can be prioritized. In other words,
those trajectories which impart a comfortable driving expe-
rience during the lane change maneuver may be prioritized.

In a further embodiment, in accordance with the prede-
termined order for searching for and/or selecting the gaps,
after the near field has been checked, an area of the mid field
that is behind the vehicle in the direction of travel of the
vehicle and/or an area of the far field that is behind the
vehicle in the direction of travel of the vehicle is/are
examined. After the near field has been checked, those areas
which are behind the vehicle in the direction of travel can
therefore also be examined. In this case, first the mid field
and then the far field can be examined according to the
predetermined order. It is therefore also possible to plan a
lane change maneuver into a gap which is behind the vehicle
in the direction of travel of the vehicle. This may mean that
the speed of the driver's own vehicle needs to be reduced.
The vehicle can therefore virtually drop behind in order to
carry out the lane change maneuver. However, provision is
preferably made, in principle, for gaps which are in front of
the vehicle in the direction of travel to be selected for the
lane change maneuver.

In a further configuration, probabilities of a successful
lane change maneuver are respectively determined when
searching for and/or selecting the gaps in the areas and, if the
respective probability exceeds a limit value, there is a
changeover to the next area according to the predetermined
order. For example, it is possible to first start with the area
of the far field that is in front of the vehicle in the direction
of travel. In this case, it is possible to determine, for
example, the probability of the predicted average gap size
being greater than a minimum gap size needed for a lane change of the vehicle. This probability can then be scaled
using appropriate empirical coefficients which model uncer-
tainties for events far in the future, for example. The integral
of these probabilities in the far field can then be determined
up to an abort distance for a successful lane change. If the
probability of the successful lane change maneuver exceeds
the limit value in the far field, the gaps can still be searched
for and/or selected in the far field. However, if the prob-
ability falls below the limit value, the mid field can addi-
tionally be considered for searching for and/or selecting the
gaps. In a similar manner to the far field, a probability of a
successful lane change can be determined in the mid field.
If this probability falls below a limit value or threshold
value, the near field can be taken into account.

In a further embodiment, the lane change maneuver is
planned such that the vehicle is maneuvered from the first
lane to an exit ramp of the road. As explained at the outset,
provision is made, in particular, for the user to be assisted
during the respective lane change maneuvers between the
lanes on the basis of the navigation command until the exit
ramp is reached. In principle, the method can also be used
for roads with three or more lanes.

Furthermore, provision is made, in particular, for a speed
profile that can be exceeded and/or a speed limit that cannot
be exceeded to be predefined for a speed of the vehicle until
the exit ramp is reached. In order to prepare for the respec-
tive lane change maneuvers between the lanes, the speed of
the vehicle or the longitudinal speed can be adjusted and, in
particular, reduced. On the one hand, a speed profile that can
be exceeded can be predefined as a soft boundary for the
speed of the vehicle. This speed profile may predefine a
setpoint speed of the vehicle starting from the current speed
of the vehicle to a target speed upon reaching the exit ramp.
The costs of the trajectories, in particular the trajectory in the
case of which the vehicle does not carry out a lane change,
can be determined on the basis of this speed profile or the
setpoint speed. However, the speed profile or the predefined
setpoint speed may possibly be exceeded. Alternatively or
additionally, speed limits that cannot be exceeded may also
be predefined for the speed of the vehicle. Such speed limits
may be given, for example, by the currently permissible
maximum speed and/or a set speed predefined by the driver.

A driver assistance system according to the invention for
a vehicle is configured to carry out a method according to the
invention and the advantageous configurations of the latter.
The driver assistance system may have, in particular, a
computing device which may be formed by at least one
electronic control unit. In principle, the computing device
may have at least one processor and/or a memory.

The driver assistance system or the computing device is
configured to receive the navigation command to carry out
the lane change maneuver from the second lane to a first lane
of a road. The driver assistance system is also configured to
search for gaps for the vehicle between further road users in
the first lane and to select one of these gaps for the lane
change maneuver. In addition, the driver assistance system
is configured to define a far field, a mid field and a near field
in the surroundings of the vehicle, wherein the near field
adjoins the vehicle, the mid field adjoins the near field and
the far field adjoins the mid field. In this case, the far field
is outside a capture range of the environmental sensors of the
vehicle and the near field and the mid field are within the
capture range of the environmental sensors. In addition, the
driver assistance system is configured to search for and/or
select the gaps according to a predetermined order. In this
order, first an area of the far field that is in front of the
vehicle in the direction of travel of the vehicle, then an area of the mid field that is in front of the vehicle in the direction of travel of the vehicle and then the near field are checked.

A vehicle according to the invention comprises a driver assistance system according to the invention. The vehicle is in the form of an automobile, in particular.

The embodiments and their advantages which are presented and preferred with respect to the method according to the invention accordingly apply to the driver assistance system according to the invention and to the vehicle according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination, but also in other combinations or alone, without departing from the scope of the invention.

The invention is now explained in more detail on the basis of preferred exemplary embodiments and with reference to the accompanying drawings, in which:

DETAILED DESCRIPTION OF THE DRAWINGS

In the figures, identical or functionally identical elements are provided with the same reference signs.

Figure 1:
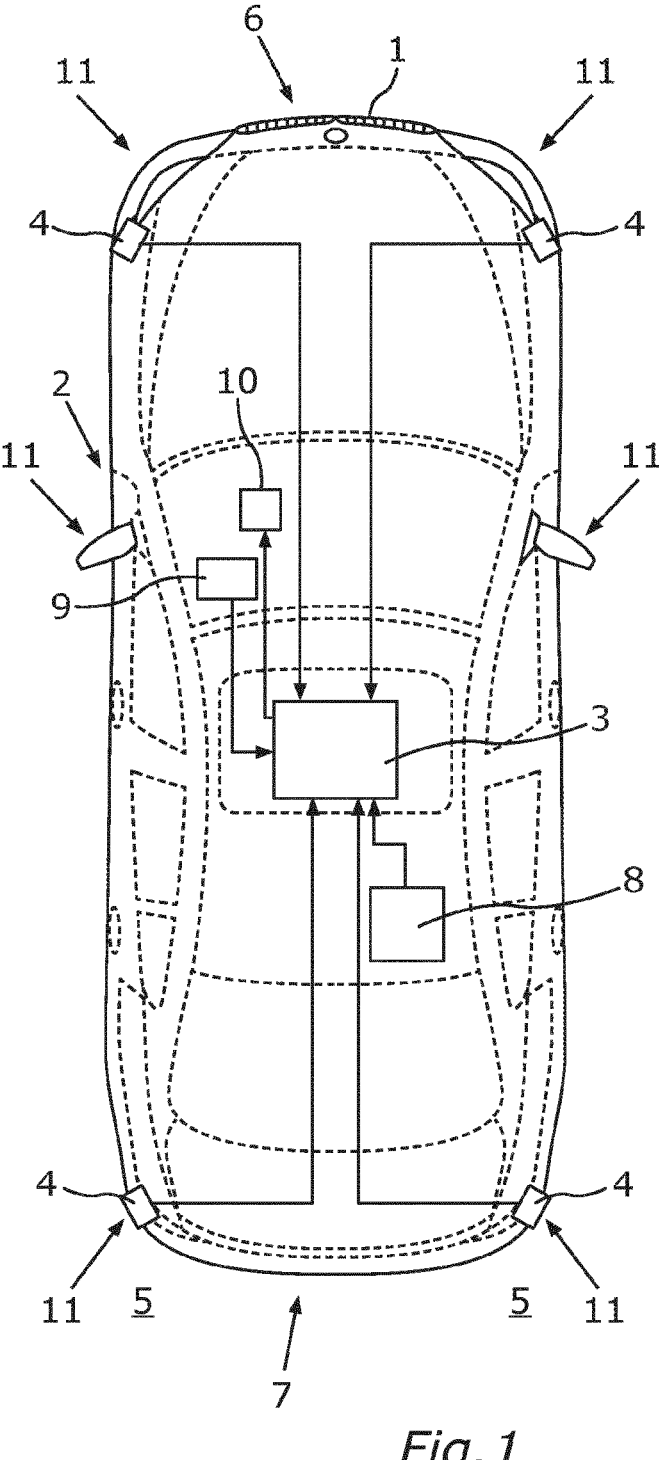
FIG. 1 shows a schematic illustration of a vehicle having a driver assistance system for assisting a user during a lane change maneuver.

FIG. 1 shows a plan view of a vehicle 1 which is in the form of an automobile in the present case. The vehicle 1 comprises a driver assistance system 2 which can be used to assist a user when carrying out lane change maneuvers. The driver assistance system 2 comprises a computing device 3 which may be formed by at least one electronic control unit, for example.

In addition, the driver assistance system 2 comprises environmental sensors 4. In the present exemplary embodiment, the driver assistance system 2 comprises four environmental sensors 4, two environmental sensors 4 of which are arranged in a front area 6 and two environmental sensors 4 of which are arranged in a rear area 7 of the vehicle 1. In the present case, the environmental sensors 4 are arranged in the respective corners of the vehicle 1. The environmental sensors 4 may preferably be in the form of radar sensors. The environmental sensors 4 can be used to carry out corresponding measurements in order to be able to capture objects and, in particular, further road users 13 in the surroundings 5 of the vehicle 1.

The computing device 3 is also configured to receive a navigation command from a navigation system 8. The computing device 3 is also configured to capture an operating action carried out by the user on an operating element 9. The operating element 9 may be, in particular, a turn signal lever. As soon as the turn signal lever or the operating element 9 is actuated by the user, corresponding turn signals 11 of the vehicle 1 may be activated. In addition, the driver assistance system 2 comprises an output device 10 which can be used to output a suggestion to the user. This suggestion may be output optically, acoustically and/or haptically, in principle.

The computing device 3 or the driver assistance system 2 is also configured to control a drive motor and/or a brake system of the vehicle 1. The speed or the longitudinal speed of the vehicle 1 may therefore be influenced. Provision may also be made for the driver assistance system 2 or the computing device 3 to be able to output control signals in order to intervene in a steering system of the vehicle 1.

Figure 2:
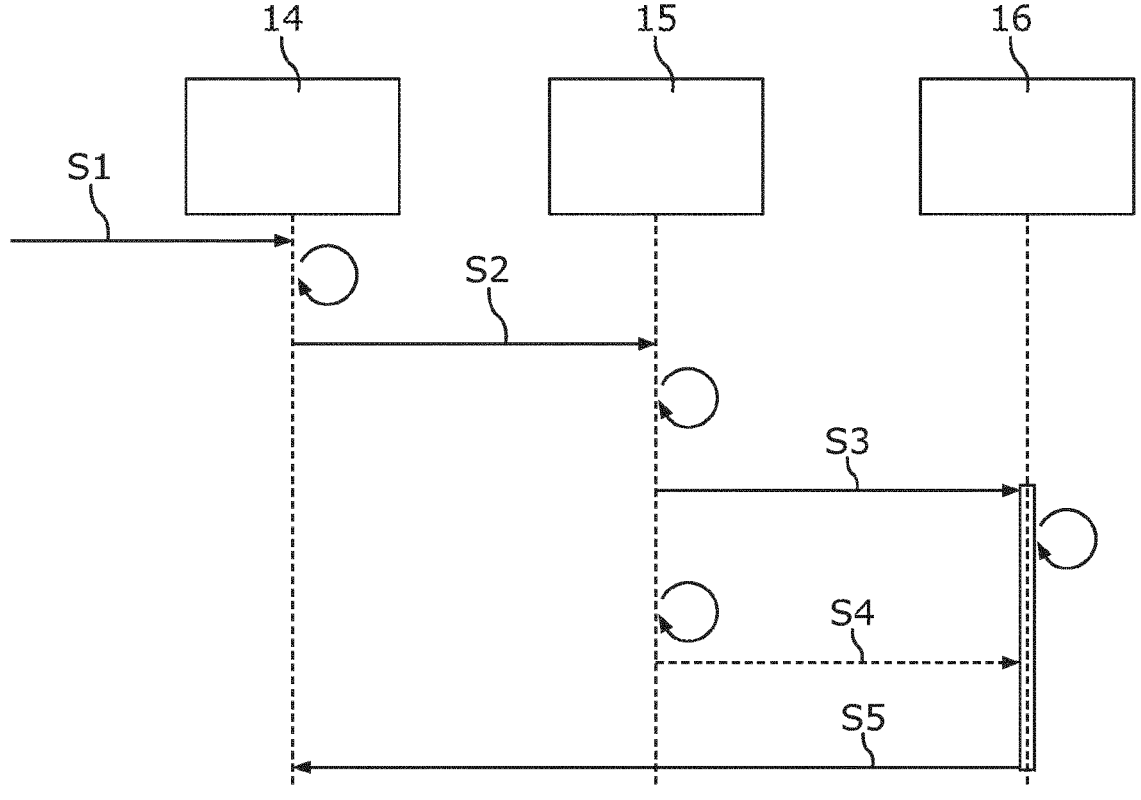
FIG. 2 shows a schematic flowchart illustrating a search for and synchronization of gaps between road users for the lane change maneuver.

The intention is to search for gaps 12 between road users 13 in the surroundings 5 of the vehicle 1. This search for gaps is part of gap synchronization which is explained in connection with FIG. 2. FIG. 2 shows a schematic flowchart describing the search for gaps and/or gap synchronization. In a step S1, the method is started and the conditions for the carrier of a function master 14 are checked. This is the case, for example, when the navigation command describing the fact that the vehicle 1 is intended to be maneuvered, across respective lanes 17, 18, 19 of a road 22, to an exit ramp 21 of the road 22 is received. In a step S2, a trigger for adjacent lane synchronization is then emitted. In a block 15 which is assigned to the search for gaps, the best gap 12 is then selected from a multiplicity of detected gaps 12 between the road users 13 and is emitted, in a step S3, as the best target for the lane change maneuver of the vehicle 1. In a block 16 which is assigned to the longitudinal synchronization, the cost function for the lane change maneuver is then assessed. If it was detected during the search for a gap that there is a better gap 12, this is emitted as the target in a step S4. As soon as the synchronization has been completed, a corresponding signal is emitted in a step S5.

Figure 3:
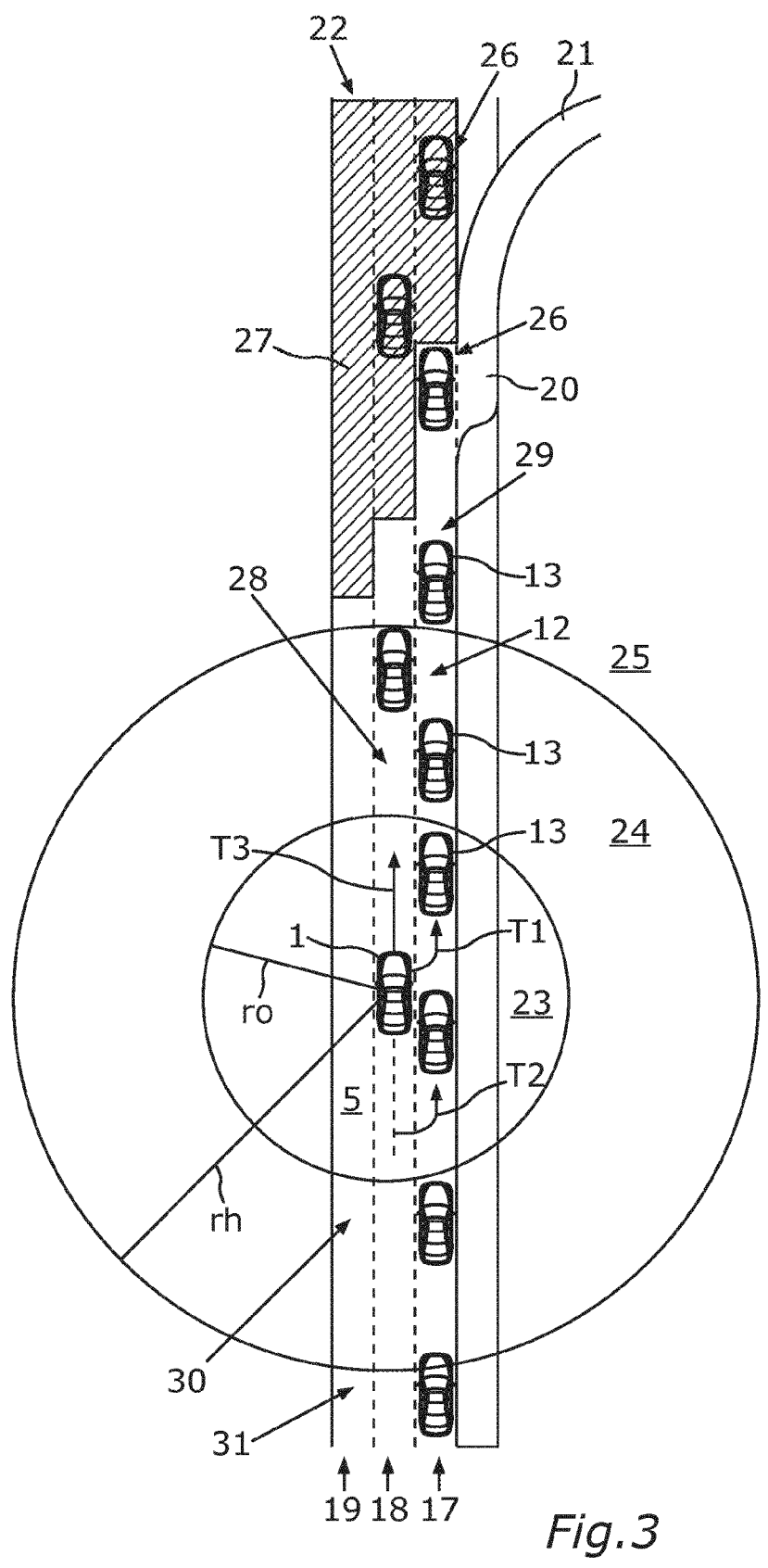
FIG. 3 shows the vehicle according to FIG. 1 which is on a multi-lane road, wherein a driving maneuver from a second lane, across a first lane, to an exit ramp of the road is planned.

FIG. 3 shows the vehicle 1 in a traffic situation. In this case, the vehicle 1 is on the road 22 having a plurality of lanes 17, 18, 19. In the present example, the road 22 comprises a first lane 17, a second lane 18 and a third lane 19. In the example shown, the vehicle 1 is in the second lane 18 or in the middle lane. On the basis of the navigation command, the vehicle 1 is intended to be maneuvered from the second lane 18 to the first lane 17 and then to a deceleration lane 20 leading to an exit ramp 21 of the road 22. A lane change maneuver from the second lane 18 to the first lane 17 and a further lane change maneuver from the first lane 17 to the deceleration lane 20 are therefore intended to be carried out with the vehicle 1. Appropriate gaps 12 are searched for and selected for the respective lane change maneuvers.

A near field 23, a mid field 24 and a far field 25 are defined in the surroundings 5 of the vehicle 1 for searching for the gaps 12 and for gap synchronization. In this case, the far field 25 is outside a capture range of the environmental sensors 4 of the driver assistance system 2. This means that the road users 13 in the far field 25 cannot be captured by the environmental sensors 4. The road users 13 in the far field 25 are predicted road users 26. These predicted road users 26 can be estimated on the basis of measurements in the near field 23 and the mid field 24 using the environmental sensors 4. In addition, data from traffic services and/or empirical values can be used.

The mid field 24 and the near field 23 are within the capture range of the environmental sensors 4. In the present example, the mid field 24 is defined by a radius rh. The gaps 12 between the road users 13 in the first lane 17 can be detected in the mid field on the basis of the measurements using the environmental sensors 4. The near field 23 directly adjoins the vehicle 1 or the outer shell of the vehicle 1. In the example, the near field 23 is defined by a radius ro. Different trajectories T1, T2 for possible lane change maneuvers from the second lane 18 to the first lane 17 can be calculated within the near field 23. A trajectory T3 describing the fact that the vehicle 1 remains in the second lane 18, that is to say no lane change is carried out with the vehicle 1, is also determined. Furthermore, a lane-based abort distance 27 is defined for the respective lanes 17, 18, 19. If the vehicle 1 reaches this area, the maneuvering of the vehicle 1 to the exit ramp 21 can be aborted.

Figure 4:
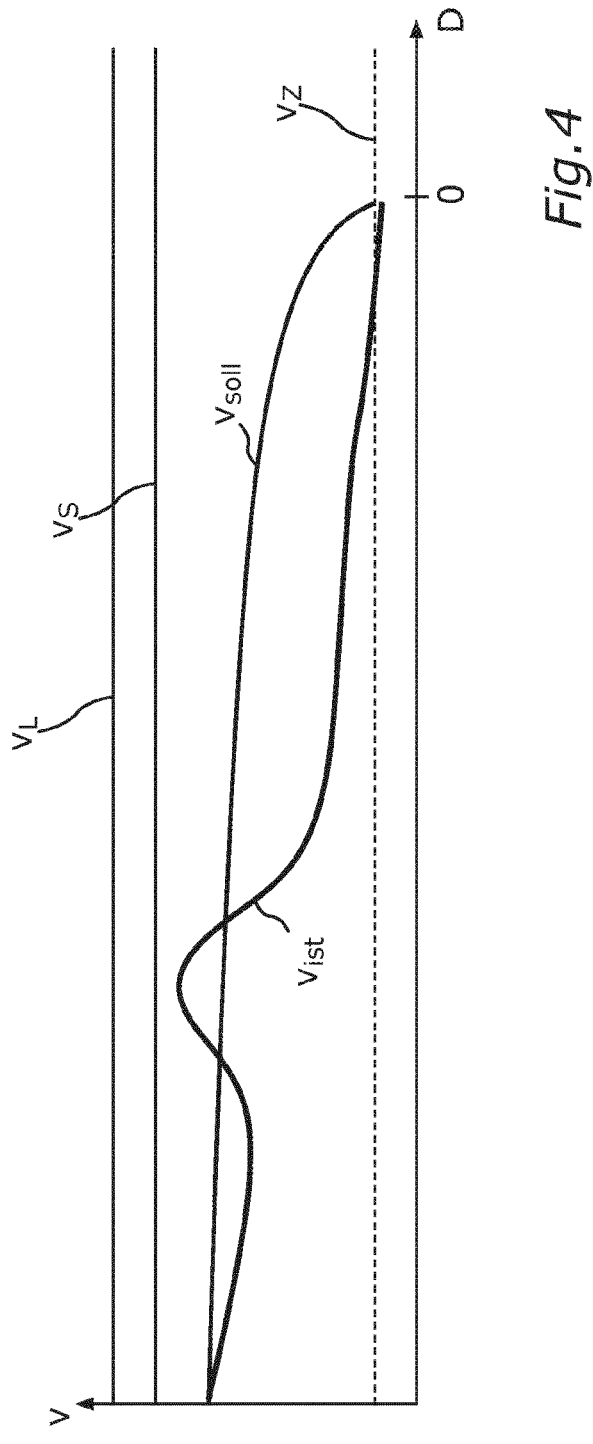
FIG. 4 shows schematic illustrations of a setpoint speed profile and speed limits.

FIG. 4 shows as possible speed profile for the vehicle 1 until reaching the exit ramp 21. In the graph according to FIG. 4, a distance D before reaching the exit ramp 21 (D=0) is illustrated on the abscissa. The speed v is plotted on the ordinate. In this case, $v_z$ describes a target speed which is intended to be achieved by the vehicle 1 upon reaching the exit ramp 21. The curve $v_{soll}$ describes a setpoint speed which can be predefined in advance. This may describe the speed profile of the vehicle 1 from the current position until the exit ramp 21 is reached. However, this speed profile may be exceeded by the vehicle 1. This is shown, by way of example, using the actual speed $v_{ist}$ of the vehicle 1. In addition, hard limits or speed limit values that cannot be exceeded are given by a set speed vs, which will be predefined by the user for speed control, and a maximum permissible maximum speed $v_L$.

Figure 5:
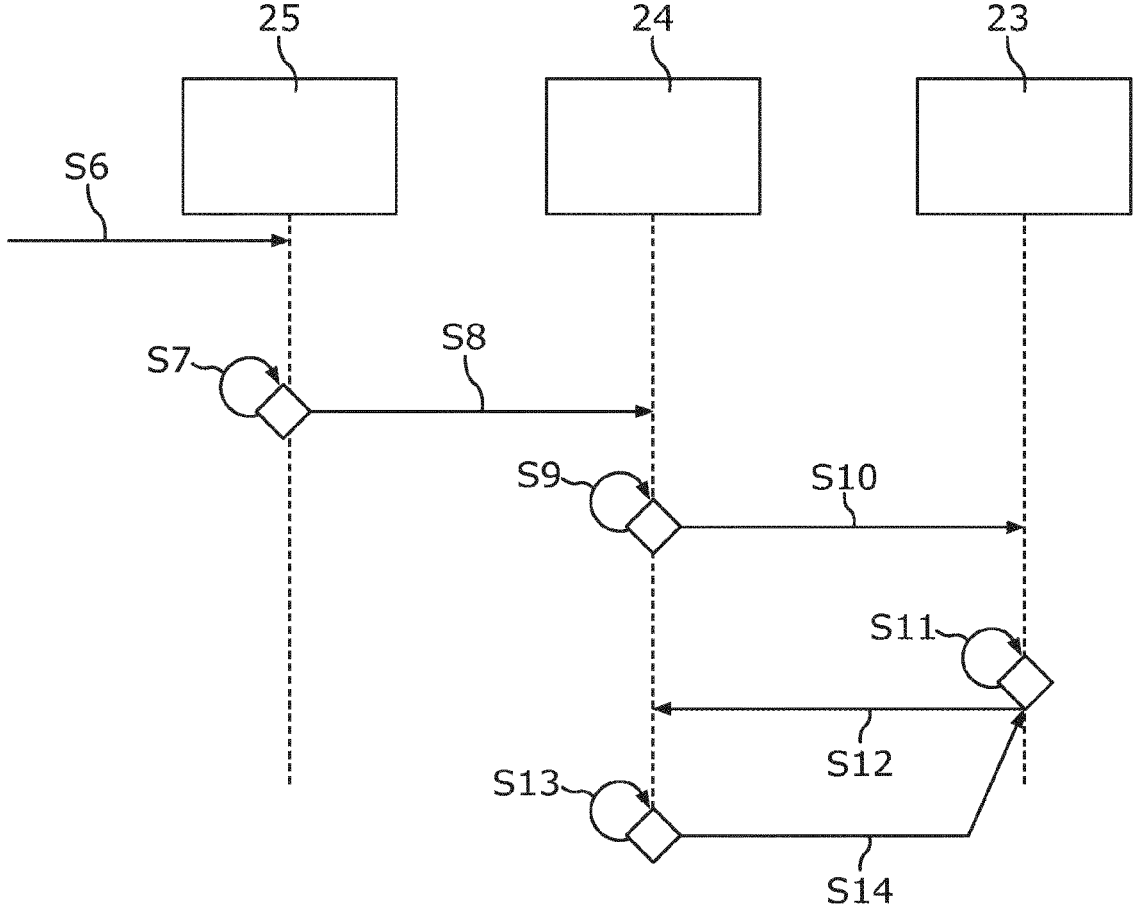
FIG. 5 shows a schematic flowchart describing a search for and/or absence of gaps in a far field, a mid field and a near field in the surroundings of the vehicle.

FIG. 5 shows a schematic illustration of a method for searching for gaps in the far field 25, the mid field 24 and the near field 23. The method is started in a step S6. Further road users 26 in the relevant lanes 17, 18, are predicted in an area 29 of the far field 25 that is in front of the vehicle 1 in the direction of travel. The road users 13 detected in the mid field 24 on the basis of the sensor data from the environmental sensors 4 can be extrapolated for this purpose. Traffic information and empirical values can also be used. The estimation in the far field 25 or in the area 29 of the far field 25 can be continuously repeated in a step S7. This can be provided, for example, if the vehicle 1 is still several kilometers away from the exit ramp 21 and/or if a high volume of traffic is not expected in the area of the exit ramp.

A probability of a successful lane change is also calculated. If the probability falls below a limit value, an area 28 of the mid field 24 that is in front of the vehicle 1 in the direction of travel will be additionally used to search for and/or select the gaps 13 in a step S8. The road users 13 and the gaps 12 between the road users 13 are continuously determined in a step S9 on the basis of the sensor data from the environmental sensors 5. In this case too, a probability of a successful lane change is determined. If this probability falls below a limit value, the search is expanded to the near field 23 in a step S10.

When checking the near field 23, the respective trajectories T1, T2 for the possible lane change maneuvers into the free gaps 13 are then continuously determined in a step S11. The trajectory T3 for the situation in which the vehicle 1 remains in the second lane 18 is also determined. The costs of the trajectories are then assessed against each other for the respective trajectories T1 to T3 on the basis of a cost function. If the respective costs of the trajectories T1, T2 for the possible lane change maneuvers are below a threshold value, synchronization to the optimum gap 13 in the near field 23 can be carried out and a message can be emitted in a step S12 indicating that the synchronization or the selection of the gap 13 has been concluded as soon as the costs for a trajectory T1, T2 for a possible lane change maneuver exceed the costs of the trajectory T3, in the case of which the vehicle 1 remains in the second lane 18.

If the respective costs of the trajectories T1, T2 for the possible lane change maneuvers are above the threshold value, an area 30 of the mid field 24 that is behind the vehicle 1 in the direction of travel is examined in a step S12. The speed of the vehicle 1 can also be reduced for this purpose. A probability of a successful lane change can then be continuously determined in a step S13. If this probability exceeds a threshold value, it is possible to wait, for example, until a suitable gap 12 for a lane change maneuver is available in the near field 23. If the probability falls below the threshold value, however, the speed of the vehicle 1 can be reduced further. An area 31 of the far field 24 that is behind the vehicle 1 in the direction of travel can also be examined.

What is claimed is:

1. A method for operating a driver assistance system of a vehicle to execute an automated lane change maneuver, comprising:

defining a far field, a mid field and a near field in the surroundings of the vehicle, wherein the near field adjoins the vehicle, the mid field adjoins the near field and the far field adjoins the mid field, wherein the far field is outside a capture range of environmental sensors of the vehicle, and wherein the near field and the mid field are within the capture range of the environmental sensors;

receiving a navigation command to carry out the automated lane change maneuver from a second lane to a first lane of a road;

searching for gaps for the vehicle between further road users in the first lane based on captured data of the environmental sensors; and selecting one of the gaps for the lane change maneuver based on the captured data; and executing the automated lane change maneuver via the selected gap, wherein the searching and/or selecting is according to a predetermined order of the far field, mid field and near field, wherein the predetermined order is: first an area of the far field that is in front of the vehicle in the direction of travel, then an area of the mid field that is in front of the vehicle in the direction of travel, and then the near field, are checked.

2. The method of claim 1, wherein a traffic density and/or an average size of the gaps between the road users is/are predicted when checking the area of the far field for the first lane.

3. The method of claim 1, wherein the gaps between the road users are detected on the basis of sensor data, which are provided by the environmental sensors, when checking the area of the mid field.

4. The method of claim 1, wherein a plurality of trajectories for possible lane change maneuvers into the gaps between the road users in the first lane are determined for checking the near field.

5. The method of claim 4, wherein the plurality of trajectories for the possible lane change maneuvers and a trajectory that describes an onward journey of the vehicle in the second lane are assessed on the basis of a cost function.

6. The method of claim 1, wherein, in accordance with the predetermined order for the searching and/or the selecting, after the near field has been checked, an area of the mid field that is behind the vehicle in the direction of travel and/or an area of the far field that is behind the vehicle in the direction of travel is/are examined.

7. The method of claim 1, wherein probabilities of a successful lane change maneuver are respectively determined when searching for and/or selecting the gaps in the areas and, if the respective probability falls below a limit value, there is a changeover to the next area according to the predetermined order.

8. The method according to claim 1, wherein the lane change maneuver is planned such that the vehicle is maneuvered from the first lane to an exit ramp of the road.

9. The method according to claim 8, wherein a speed profile that can be exceeded and/or a speed limit that cannot be exceeded is/are predefined for a speed of the vehicle until the exit ramp is reached.

10. A driver assistance system for a vehicle, wherein the driver assistance system is configured to carry out a method according to claim 1.

\*  \*  \*  \*  \*